(12) United States Patent
Hamada et al.

(10) Patent No.: US 12,436,539 B2
(45) Date of Patent: Oct. 7, 2025

(54) BOAT AND LATERAL MOVEMENT CONTROL METHOD FOR BOAT

(71) Applicant: YAMAHA HATSUDOKI KABUSHIKI KAISHA, Iwata (JP)

(72) Inventors: Satoru Hamada, Shizuoka (JP); Akihiro Onoue, Shizuoka (JP); Toshio Suzuki, Shizuoka (JP); Masaru Suemori, Shizuoka (JP); Yoshiyuki Kadobayashi, Shizuoka (JP); Manami Oyama, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 317 days.

(21) Appl. No.: 18/111,276

(22) Filed: Feb. 17, 2023

(65) Prior Publication Data

US 2023/0418309 A1 Dec. 28, 2023

(30) Foreign Application Priority Data

Jun. 27, 2022 (JP) .................................. 2022-102374

(51) Int. Cl.
| | |
|---|---|
| *G05D 1/08* | (2006.01) |
| *B63B 39/06* | (2006.01) |
| *B63B 79/10* | (2020.01) |
| *B63B 79/40* | (2020.01) |
| *G05D 1/00* | (2006.01) |

(52) U.S. Cl.
CPC ......... *G05D 1/0875* (2013.01); *B63B 39/061* (2013.01); *B63B 79/40* (2020.01); *B63B 79/10* (2020.01)

(58) Field of Classification Search
CPC ....... B63B 39/061; B63B 79/40; B63B 79/10; G05D 1/24; G05D 1/49; G05D 2105/22; G05D 2107/84; G05D 2109/34; G05D 2111/52; G05D 1/645; B63H 20/10
See application file for complete search history.

(56) References Cited

U.S. PATENT DOCUMENTS

| | | | |
|---|---|---|---|
| 3,998,176 A * | 12/1976 | Stout | B63B 1/22 |
| | | | 114/271 |
| 6,350,164 B1 * | 2/2002 | Griffith, Sr. | B63H 5/08 |
| | | | 114/151 |
| 6,406,341 B1 * | 6/2002 | Morejohn | B63B 1/042 |
| | | | 114/288 |
| 7,210,422 B1 * | 5/2007 | Hickok | B63B 39/06 |
| | | | 114/152 |
| 10,814,952 B2 * | 10/2020 | Inoue | G05D 1/0208 |
| 11,402,838 B1 * | 8/2022 | Ito | B63H 20/12 |

(Continued)

FOREIGN PATENT DOCUMENTS

JP 2020-168921 A 10/2020

*Primary Examiner* — Mussa A Shaawat
(74) *Attorney, Agent, or Firm* — Keating & Bennett, LLP

(57) ABSTRACT

In a boat including a hull, when the hull is moved laterally based on an output from the outboard motor, the hull rolls, which may cause discomfort to a user or passengers. To compensate for this, a lateral movement control method for the boat including the hull and the outboard motor includes generating a propulsion force to laterally move the hull with the output of the outboard motor, and executing a roll reduction process to reduce a roll angle of the hull at a time of laterally moving the hull.

20 Claims, 5 Drawing Sheets

(56) References Cited

U.S. PATENT DOCUMENTS

| | | | |
|---|---|---|---|
| 2007/0089660 A1* | 4/2007 | Bradley | B63H 21/22 |
| | | | 114/144 A |
| 2009/0188416 A1* | 7/2009 | Hickok | B63B 3/44 |
| | | | 114/1 |
| 2010/0094491 A1* | 4/2010 | Oehlgrien | G05D 1/49 |
| | | | 73/178 R |
| 2013/0110329 A1* | 5/2013 | Kinoshita | G05D 1/0206 |
| | | | 367/107 |
| 2017/0255201 A1* | 9/2017 | Arbuckle | B63J 99/00 |
| 2018/0229823 A1* | 8/2018 | Inoue | G05D 1/0208 |
| 2020/0331578 A1* | 10/2020 | Sakashita | B63H 5/125 |

* cited by examiner

BOAT AND LATERAL MOVEMENT CONTROL METHOD FOR BOAT

CROSS REFERENCE TO RELATED APPLICATIONS

This application claims the benefit of priority to Japanese Patent Application No. 2022-102374 filed on Jun. 27, 2022. The entire contents of this application are hereby incorporated herein by reference.

BACKGROUND OF THE INVENTION

1. Field of the Invention

The techniques disclosed herein relate to a lateral movement control method for a boat.

2. Description of the Related Art

Conventionally, there have been known boats equipped with a hull and an outboard motor and having a function of moving the hull laterally based on power of the outboard motor (see, e.g., Japanese Unexamined Patent Application Publication No. 2020-168921). The hull capable of moving laterally can improve the operability when the hull is operated in a narrow space such as a narrow channel or a marina, e.g., when the hull is berthed or unberthed.

When a hull is moved laterally based on power of the outboard motor, the hull rolls, which may cause discomfort to the user or the crew. The roll of the hull means that the hull rotates (tilts) with respect to an axis along the longitudinal direction, and is also called horizontal oscillation or rolling. Therefore, there is room for improvement in lateral movement control of boats. These problems are not limited to outboard motors, but are also common when the hull is moved laterally based on power of other boat propellers such as jet propellers.

SUMMARY OF THE INVENTION

Preferred embodiments of the present invention disclose technologies that are able to solve the above-described problems.

Preferred embodiments of the present invention may be implemented in the following aspects.

According to a preferred embodiment of the present invention, a lateral movement control method for a boat including a hull and an outboard motor includes generating a propulsion force to laterally move the hull based on an output from the outboard motor, and executing a roll reduction process to reduce a roll angle of the hull at a time of laterally moving the hull. The roll reduction process includes generating a lateral movement propulsion force to the hull based on the output from the outboard motor. Thus, the lateral movement control method is able to reduce the roll angle at the time of laterally moving the hull.

According to a preferred embodiment of the present invention, a lateral movement control method for a boat including a hull and a boat propeller includes generating a propulsion force to laterally move the hull based on an output from the boat propeller, and executing a roll reduction process to reduce the roll angle of the hull at a time of laterally moving the hull. The lateral movement control method is able to reduce the roll angle at the time of laterally moving the hull.

The techniques disclosed herein may be implemented in a variety of aspects, including, e.g., boats, propulsion controllers provided on boats, lateral movement control methods for boats, and non-transitory computer-readable media including computer programs to implement the functions or methods of these devices.

The lateral movement control methods disclosed herein are able to reduce the roll angle at a time of laterally moving a hull.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
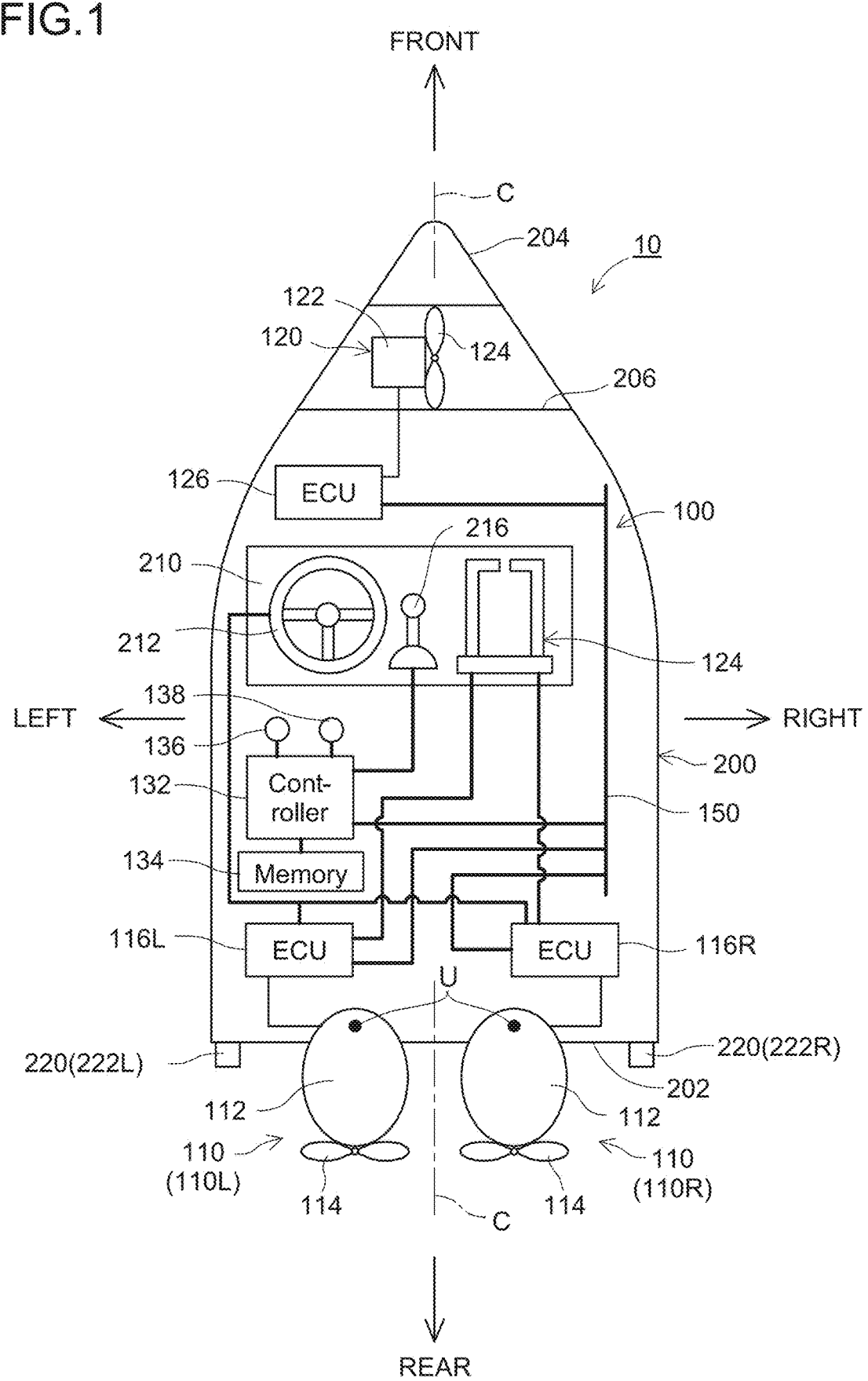
FIG. 1 is a top view schematically illustrating a configuration of a boat according to a preferred embodiment of the present invention.
Figure 2:
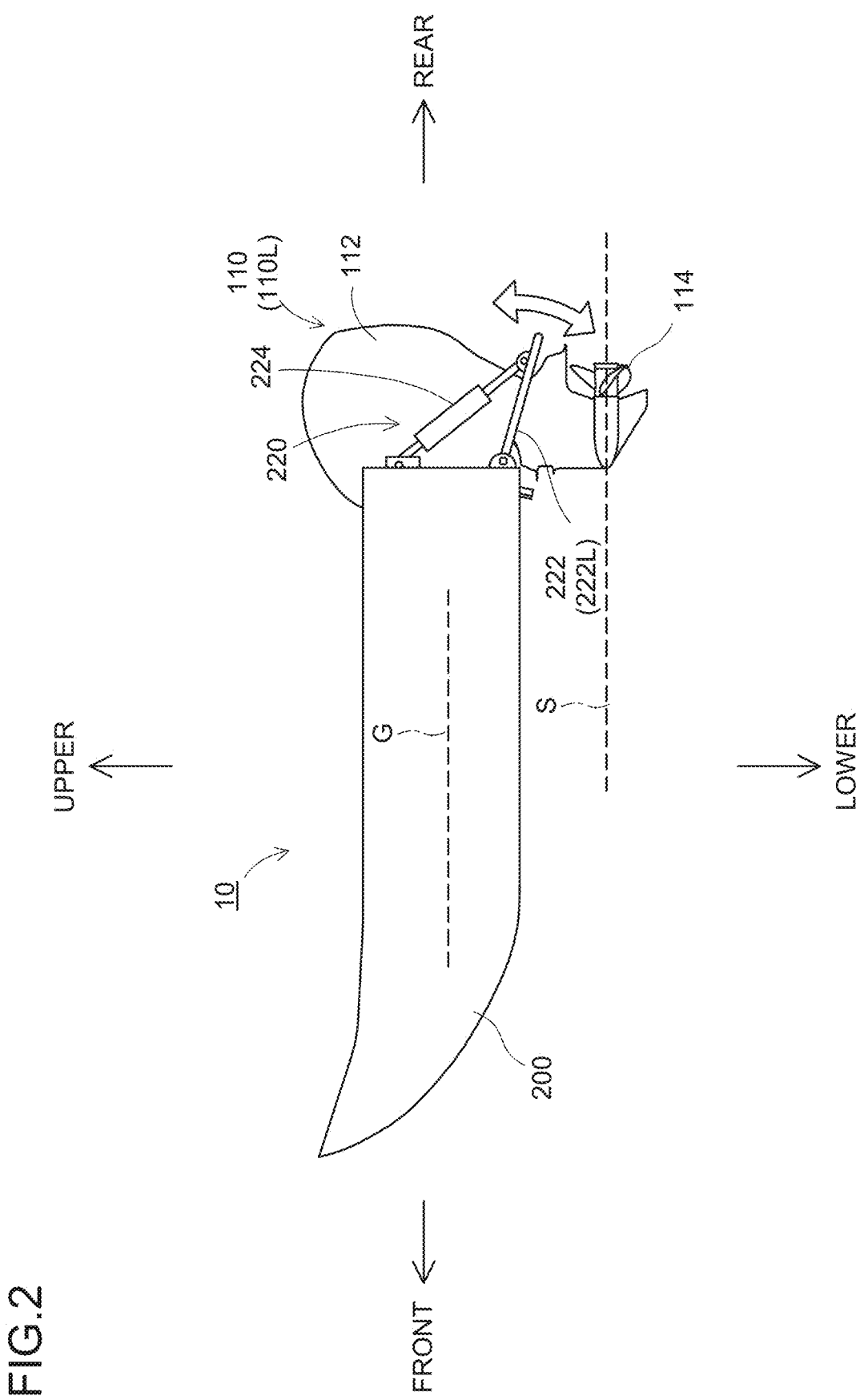
FIG. 2 is a side view schematically illustrating a configuration of the boat.

FIG. 1 is a top view schematically illustrating a configuration of a boat 10 according to a preferred embodiment of the present invention, and FIG. 2 is a side view schematically illustrating a configuration of the boat 10. FIGS. 1 and 2 and other figures to be described below show arrows representing directions relative to the position of the boat 10. More specifically, each figure shows arrows representing the front direction (FRONT), the rear direction (REAR), the leftward direction (LEFT), the rightward direction (RIGHT), the upper direction (UPPER), and the lower direction (LOWER). The front-rear direction, the left-right direction, and the upper-lower direction (vertical direction) are mutually orthogonal.

As shown in FIG. 1, the boat 10 includes a hull 200 and a boat propulsion system (hereinafter referred to as "propulsion system") 100 mounted on the hull 200.

The hull 200 includes an operating device 210 and an attitude control unit 220. The operating device 210 includes a steering operation unit 212 operable to steer the boat 10, a throttle operation unit 214 operable to adjust the output of each outboard motor 110 described below, and a joystick 216 operable to steer and adjust the output of each outboard motor 110 and a bow thruster 120. The joystick 216 is an example of an operator.

The attitude control unit 220 controls the attitude of the hull 200. The attitude control unit 220 is located at a stern (transom) 202 of the hull 200 and includes a plurality of trim tabs 222 and a plurality of displacement mechanisms 224. The plurality of trim tabs 222 include a right trim tab 222R and a left trim tab 222L (see FIG. 1). The right trim tab 222R and the left trim tab 222L are mounted at positions symmetrical with respect to a center line C passing through the center of the hull 200 in the left-right direction with a plurality of outboard motors 110 interposed therebetween.

The trim tab 222 is a plate-shaped member (see FIG. 2) including a surface facing the water surface W (see FIG. 5, which will be described below), and is also called a flap. The trim tab 222 is attached to the hull 200 so that the rear end side is able to move in the vertical direction pivotably around the front end side. Each displacement mechanism 224 moves the trim tab 222 up and down in accordance with an instruction from the boat operation control device 130 described below. The displacement mechanism 224 is, e.g., a hydraulic device including a hydraulic cylinder and a piston rod.

The propulsion system 100 includes a plurality of outboard motors 110, a bow thruster 120 provided separately from the outboard motors 110, and the boat operation control device 130 as a boat operation control device to control these devices. The outboard motor 110 includes a boat propeller.

The outboard motor 110 generates a thrust to propel the boat 10. The plurality of outboard motors 110 are located at the stern 202 of the hull 200, and apply a propulsion force to the hull 200 behind the instantaneous turning center P of the hull 200 (see FIG. 4 described later). In the present preferred embodiment, the plurality of outboard motors 110 include a left outboard motor 110L and a right outboard motor 110R. The left outboard motor 110L and the right outboard motor 110R are arranged at positions symmetrical to each other with regard to the center line C of the hull 200.

Each outboard motor 110 includes a propulsion unit 112 and a propeller 114. The propeller 114 is a rotating body including a plurality of wings, and generates thrust by rotating. The propeller 114 is at a lower position of the propulsion unit 112 and is rotatably provided around a horizontal propeller rotating axis S (see FIG. 2). The propulsion unit 112 includes an engine and a power transmission mechanism as drive sources. Power from the engine is transmitted to the propeller 114 through a power transmission mechanism to rotate the propeller 114. Each outboard motor 110 is pivotably mounted around a steering axis U as a vertical pivot axis (see FIG. 1 and FIG. 4 described below).

The bow thruster 120 is provided at a bow 204 of the hull 200. The bow thruster 120 is a propeller to apply a propulsion force to the hull 200 in the left-right direction. The bow thruster 120 includes an electric motor 122 and the propeller 114. In the vicinity of the bow 204 of the hull 200, a through hole 206 penetrating the hull 200 in the left-right direction is provided at a location lower than the water surface W. The bow thruster 120 is provided in the through hole 206 and is rotatable around a left-right rotation axis. The propeller 114 is rotated by the power generated by the electric motor 122. Specifically, the propeller 114 generates a propulsion force to the right by the forward rotation of the electric motor 122, and generates a propulsion force to the left by the reverse rotation.

The left outboard motor 110L and the right outboard motor 110R include electronic control units 116L and 116R (hereinafter referred to as "left ECU 116L" and "right ECU 116R", respectively). The bow thruster 120 includes an electronic control unit 126 (hereinafter referred to as "bow ECU 126") to control the rotation direction and on/off of the electric motor 122. However, in FIG. 1, for clarity, the bow thruster 120 and the bow ECU 126 are shown separately, the left outboard motor 110L and the left ECU 116L are shown separately, and the right outboard motor 110R and the right ECU 116R are shown separately.

The boat operation control device 130 includes a controller 132 and a storage device 134. The controller 132 controls, e.g., the outboard motor 110 and the bow thruster 120. The controller 132 includes, e.g., a CPU, a multi-core CPU, and a programmable device (field programmable gate array (FPGA) and programmable logic device (PLD), among others). The storage device 134 includes, e.g., a ROM, a RAM, and a hard disk drive (HDD), among others. The storage device 134 stores various programs and data, and is used as a work area and a data storage area to execute various processes. For example, the storage device 134 stores a computer program to execute a lateral movement control process to be described below. The computer program is stored in a computer-readable recording medium (not shown) such as a CD-ROM, DVD-ROM, or USB memory, and is stored in the storage device 134 by being installed in the boat operation control device 130.

The boat operation control device 130 sets a target value of the propulsion force of each outboard motor 110 and the bow thruster 120 in accordance with the operation amount of the joystick 216 by the user, and controls each propeller (specifically, the ECU of each propeller) to generate an individual target propulsion force. Specifically, the boat operation control device 130 communicates with the bow ECU 126, the left ECU 116L, and the right ECU 116R via a communication line 150 in the hull 200. The controller 132 is connected to a gyro sensor 136 and a global positioning system (GPS) sensor 138. The controller 132 acquires the attitude and current position of the boat 10 based on respective detection signals of the gyro sensor 136 and the GPS sensor 138.

Figure 3:
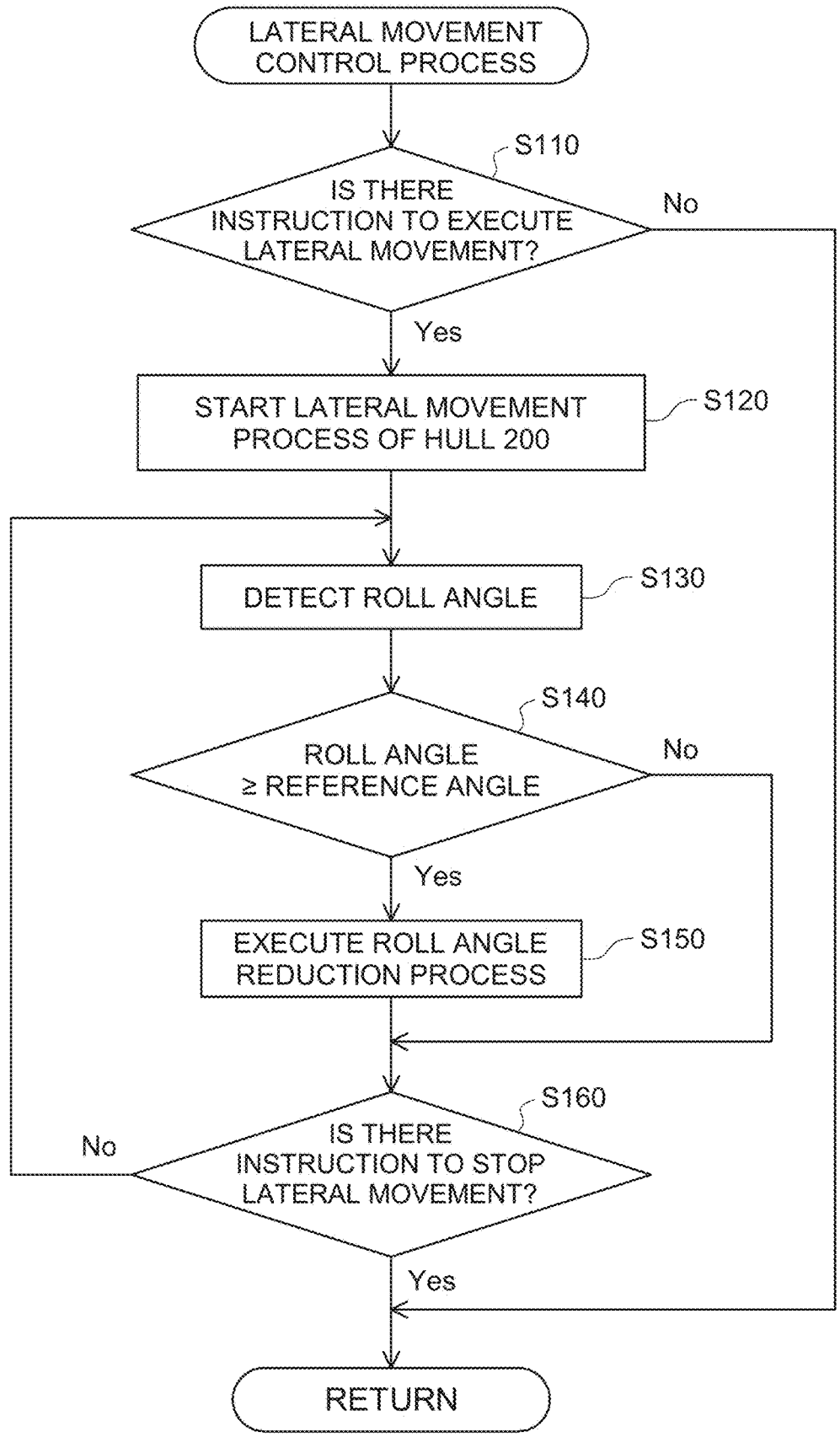
FIG. 3 is a flowchart illustrating a lateral movement control process.

FIG. 3 is a flowchart showing the lateral movement control process. The lateral movement control process moves the boat 10 laterally. The lateral movement is a translational movement to move the hull 200 in a direction including left-right directional components (e.g., a rightward direction or a diagonally backward right direction) while maintaining the longitudinal direction without accompanying the turning of the hull 200. In the lateral movement, the hull 200 preferably moves at a lateral acceleration of, e.g., about 0.1 G or less. When the boat operation control device 130 is started, the controller 132 executes the lateral movement control process.

As shown in FIG. 3, the controller 132 determines whether or not there is an instruction to execute the lateral movement (S110). In the present preferred embodiment, when the user operates (tilts) the joystick 216 in an arbitrary direction, the boat operation control device 130 receives an operation signal indicating an operation direction and an operation amount (tilting amount) of the joystick 216. Upon receiving the operation signal indicating that the operation direction is the leftward direction or the rightward direction, the controller 132 determines that there is an instruction to execute the lateral movement (S110: Yes), and starts the lateral movement process (S120). The process in S120 is an example of the lateral movement step. When there is no instruction to execute the lateral movement (S110: No), the controller 132 enters a standby state without starting the lateral movement process.

The lateral movement process generates a lateral movement propulsion force to the hull 200 based on a propulsion force of the outboard motor 110. In the present preferred embodiment, the boat 10 is moved laterally by using the propulsion force of the bow thruster 120 in addition to the outboard motor 110.

Figure 4:
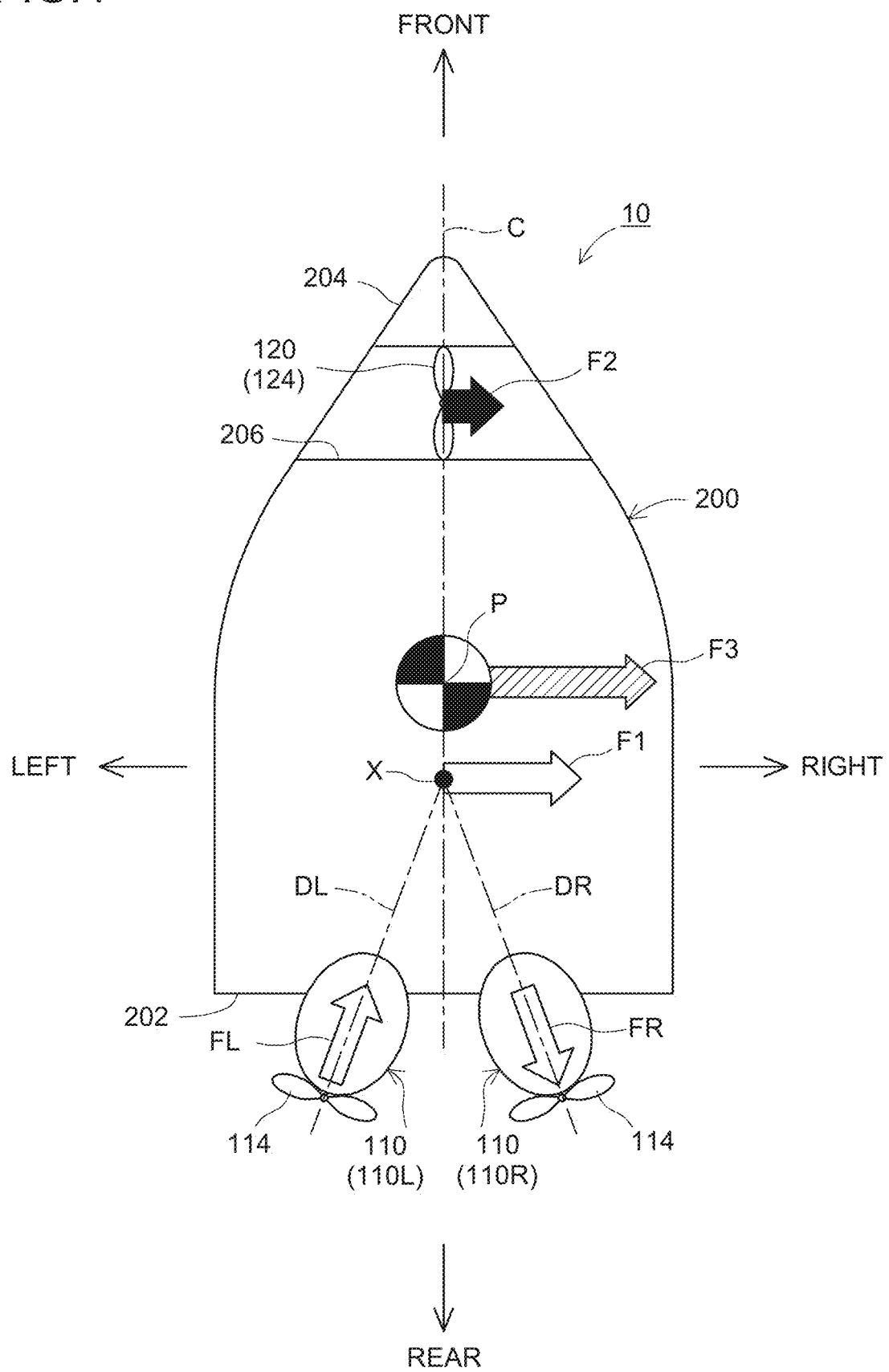
FIG. 4 is an explanatory diagram schematically illustrating the propulsion force of each propeller during lateral movement.

FIG. 4 is an explanatory diagram schematically illustrating the propulsion force of each propeller during lateral movement. FIG. 4 illustrates the boat 10 moving laterally in the rightward direction. As shown in FIG. 4, a rightward propulsion force F1 is generated by a left propulsion force FL generated by the left outboard motor 110L and a right propulsion force FR generated by the right outboard motor 110R. For this purpose, the direction of each outboard motor 110 is changed so that the left action line DL of the left propulsion force FL and the right action line DR of the right propulsion force FR intersect each other in front of the outboard motor 110. In other words, the action lines DL and DR are inclined with respect to the center line C of the hull 200. The left outboard motor 110L and the right outboard motor 110R rotate the propeller 114 in opposite directions to each other. As a result, the resultant force of the left propulsion force FL and the right propulsion force FR is generated as the rightward propulsion force F1 at the intersection point X between the left action line DL and the right action line DR. Further, in the present preferred embodiment, the bow thruster 120 generates a rightward propulsion force F2. Therefore, the propulsion force F3, which is the resultant force of the rightward propulsion force F1 and the rightward propulsion force F2, is generated in the hull 200, and the hull 200 moves laterally.

It should be noted that the magnitudes of the propulsion force F1 and the propulsion force F2 are set so that the yawing moment (hereinafter referred to as "moment") around the pivot center P by the propulsion force F1 and the moment around the pivot center P by the propulsion force F2 cancel each other. The outputs of the outboard motor 110 and the bow thruster 120 are controlled according to the operation amount of the joystick 216. Specifically, the controller 132 sets a hull target value, which is the target value of the propulsion force F3, in accordance with the tilt amount of the joystick 216.

Figure 5:
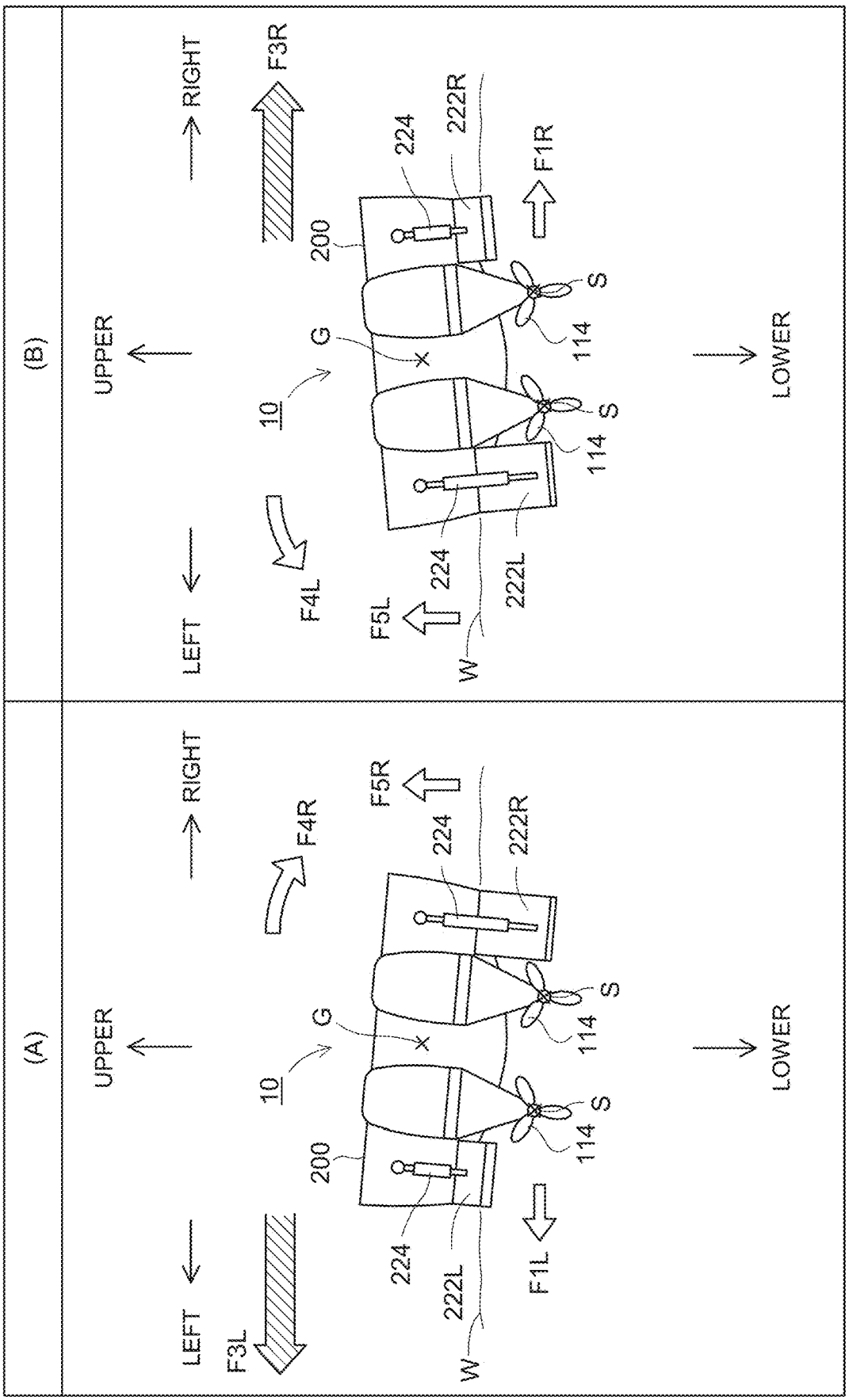
FIG. 5 is a schematic view of the boat to explain a roll reduction process by an attitude control unit.

FIG. 5 is a schematic view of the boat 10 for explaining a roll reduction process by the attitude control unit 220. FIG. 5A illustrates the boat 10 moving laterally to the left, and FIG. 5B illustrates the boat 10 moving laterally to the right.

When the boat 10 moves laterally, the boat 10 may roll. In the boat 10 of the present preferred embodiment, the boat 10 is particularly easy to roll. The propeller rotating axis S of the outboard motor 110 is located lower than the gravity center height G of the hull 200 (see FIGS. 2 and 5). Therefore, the propulsion force F1 (F1L, F1R) is generated by the outboard motor 110 at a position lower than the gravity center height G of the hull 200. Therefore, as shown in FIG. 5A, when the boat 10 moves laterally in the leftward direction, a force F4R that tilts the hull 200 to the right is exerted by the leftward propulsion force F1L by the outboard motor 110. Further, as shown in FIG. 5B, when the boat 10 moves laterally in the rightward direction, a force F4L that tilts the hull 200 to the left is exerted by the rightward propulsion force F1R by the outboard motor 110.

Next, the controller 132 detects the roll angle of the boat 10 during lateral movement (S130). The controller 132 is able to detect the roll angle of the hull 200 based on a detection signal from the gyro sensor 136. The process in S130 is an example of the detection step.

The controller 132 executes the roll angle reduction process to reduce the roll angle of the hull 200 based on the detection result of the roll angle in S130. Specifically, the controller 132 determines whether or not the detected roll angle is equal to or larger than a reference angle (e.g., about 5 deg or more) (S140), and if the controller determines that the roll angle is equal to or larger than the reference angle (S140: Yes), the controller 132 executes the roll angle reduction process (S150). On the other hand, if the controller 132 determines that the roll angle is less than the reference angle (S140: No), the process proceeds to S160 without executing the roll angle reduction process.

The roll angle reduction process includes, e.g., the following three processes. The controller 132 may perform all three processes, or two or one of these processes.

(1) Attitude Control Process

The attitude control process reduces an increase in the roll angle (the inclination angle of the hull 200 with respect to the vertical direction) caused by lateral movement based on attitude control of the hull 200 by the attitude control unit 220.

As shown in FIG. 5A, when the boat 10 moves laterally in the leftward direction and the roll angle is equal to or larger than the reference angle, the right trim tab 222R is moved to lower than the left trim tab 222L at a position in contact with the water surface W to generate buoyancy F5R. As a result, the buoyancy F5R generated in the right trim tab 222R cancels the force F4R that tilts the hull 200 to the right, thus reducing the roll angle of the hull 200 and right rotation of the hull 200. As shown in FIG. 5B, when the boat 10 moves laterally in the rightward direction and the roll angle is equal to or larger than the reference angle, the left trim tab 222L is moved to lower than the right trim tab 222R at a position in contact with the water surface W to generate buoyancy F5L. As a result, the buoyancy F5R generated in the left trim tab 222L cancels the force F4L that tilts the hull 200 to the left, thus reducing the roll angle of the hull 200 and left rotation of the hull 200.

The controller 132 moves the left trim tab 222L to a lower position as the detected roll angle (or the angular difference of the roll angle with respect to the reference angle) becomes larger, so as to reduce or prevent the occurrence of the roll of the hull 200. Thus, the attitude control process is able to control the left and right trim tabs 222 during lateral movement, thus reducing the roll angle of the hull 200 during lateral movement.

(2) Output Adjustment Process

The output adjustment process reduces an increase in the roll angle accompanying the lateral movement based on adjustment of the outputs of the outboard motor 110 and the bow thruster 120.

For example, as shown in FIG. 5A, when the boat 10 moves laterally in the leftward direction and the roll angle is equal to or larger than the reference angle, the outputs of the outboard motor 110 and the bow thruster 120 (propulsion forces F1, F2) are lowered to reduce the propulsion force F3L in the leftward direction. This reduces the force F4R that tilts the hull 200 to the right and thus reduces the roll angle of the hull 200 in a rightward rotation. As shown in FIG. 5B, when the boat 10 moves laterally in the rightward direction and the roll angle is equal to or larger than the reference angle, the outputs of the outboard motor 110 and the bow thruster 120 (propulsion forces F1, F2) are lowered to reduce the propulsion force F3R in the rightward direction. This reduces the force F4L that tilts the hull 200 to the left and thus reduces the roll angle of the hull 200 in a leftward rotation. The controller 132 reduces the outputs of the outboard motor 110 and the bow thruster 120 as the detected roll angle (or the angle difference of the roll angle with respect to the reference angle) becomes larger, so as to reduce the acceleration of the lateral movement of the hull 200 and reduce or prevent the occurrence of the roll of the hull 200. Thus, the output adjustment process is able to adjust the output of the outboard motor 110 or the like at the time of lateral movement, thus reducing the roll angle of the hull 200 at the time of lateral movement.

(3) Operation Restriction Process

The operation restriction process reduces an increase in the roll angle accompanying the lateral movement based on restriction of the operation with the joystick 216.

As shown in FIG. 5A, when the boat 10 moves laterally in the leftward direction and the roll angle is equal to or larger than the reference angle, the output change rate, which is the output of the outboard motor 110 and the bow thruster 120 with respect to a unit operation amount of the joystick 216, is reduced. As a result, the output change rates of the outboard motor 110 and the bow thruster 120 are reduced with respect to the operation amount of the joystick 216, and the roll angle in a rightward rotation of the hull 200 is reduced. As shown in FIG. 5B, when the boat 10 moves laterally in the rightward direction and the roll angle is equal to or larger than the reference angle, the output change rate is reduced. As a result, the output change rates of the outboard motor 110 and the bow thruster 120 are reduced with respect to the operation amount of the joystick 216, and the roll angle in a leftward rotation of the hull 200 is reduced. Therefore, e.g., even when the user suddenly pushes down the joystick 216 to sharply increase the output in the lateral movement direction, the output change rate is limited, thus reducing the roll angle.

The controller 132 reduces the output change rates of the outboard motor 110 and the bow thruster 120 as the detected roll angle (or the angle difference of the roll angle with respect to the reference angle) become larger, thus reducing the acceleration of lateral movement of the hull 200 in response to the operation of the joystick 216 and reducing or preventing the occurrence of roll of the hull 200. Thus, the operation restriction process is able to adjust the output of the outboard motor relative to the unit operation amount of the joystick 216 during lateral movement, thus reducing the roll angle of the hull 200 during lateral movement.

The controller 132 determines whether or not there is an instruction to stop the lateral movement during or after execution of the roll angle reduction process in S150 (S160). Upon receiving the operation signal indicating that the joystick 216 has been returned to the initial position (the operation amount is 0), the controller 132 determines that there is an instruction to stop the lateral movement (S160: Yes), and returns to S110. When there is no instruction to stop the lateral movement (S160: No), the controller 132 returns to S130, and continues the roll angle reduction process (S150) under the condition that the roll angle is equal to or larger than the reference angle (S140: Yes).

As described above, the boat 10 includes the hull 200, the outboard motor 110, and the controller 132. The controller 132 generates a propulsion force to cause lateral movement of the hull 200 based on an output of the outboard motor 110 (S120), and executes a roll reduction process to reduce the roll angle of the hull 200 during lateral movement (examples of the roll control process are S130 to S150). Thus, preferred embodiments of the present invention are able to reduce the roll angle at the time of lateral movement of the hull 200.

In a preferred embodiment of the present invention, the controller 132 executes the roll angle reduction process (S140 and S150) to reduce the roll angle of the hull 200 based on the result of the detection of the roll angle in S130. Therefore, the roll angle of the hull 200 at the time of lateral movement is reduced more accurately than a configuration without utilizing the detection result of the roll angle.

The techniques disclosed herein are not limited to the above-described preferred embodiments, and can be modified in various ways without departing from the spirit thereof, e.g., the following modifications are also possible.

The structure of the boat 10, the hull 200, and the propulsion system 100 in the above preferred embodiments are merely examples and can be modified in various ways. For example, in the above preferred embodiments, the hull 200 includes the attitude control unit 220, but the hull may not include the attitude control unit 220. In the above preferred embodiments, the propulsion system 100 may be configured without at least one of the outboard motor 110 and the bow thruster 120. Further, the propulsion system 100 may include one outboard motor 110 or three or more outboard motors 110.

In the above preferred embodiments, the boat propeller is provided on an outboard motor 110, but it may be provided on another type of propulsion device or, e.g., a jet propeller may be provided.

In the above preferred embodiments, the operating unit is the joystick 216, but other types of operating units such as a lever type operating unit may be used. In the above preferred embodiments, the number of the plurality of trim tabs 222 may be four or more.

The content of the lateral movement control process in the above preferred embodiments are merely examples and can be modified in various ways. For example, in S110 of the lateral movement control process shown in FIG. 3, the controller 132 detects the lateral movement of the hull 200 (the boat 10) based on the presence or absence of an instruction to execute the lateral movement by the operation of the joystick 216, but the controller 132 may detect the lateral movement of the hull 200 based on, e.g., the positional displacement of the boat 10 detected by the GPS sensor 138. Further, in the process in S160, the controller 132 detects the stoppage of lateral movement of the hull 200 (the boat 10) based on the presence or absence of the stop instruction of the lateral movement caused by the operation of the joystick 216, but the stoppage of lateral movement of the hull 200 may be detected based on positional displacement of the boat 10 detected by the GPS sensor 138.

In the lateral movement control process in the above preferred embodiment shown in FIG. 3, the processes of S130 and S140 may be omitted and the roll angle reduction process may be executed just upon detection of the lateral movement of the hull 200. Furthermore, in the lateral movement process in S120, only the propulsion force F1 of the outboard motor 110 may be used without using the propulsion force F2 of the bow thruster 120.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A lateral movement control method for a boat including a hull and a propulsion device, the method comprising:
   generating a propulsion force to laterally move the hull based on an output from the propulsion device without turning the hull; and
   executing a roll reduction process to reduce a roll angle of the hull at a time of laterally moving the hull.

2. The lateral movement control method according to claim 1, further comprising:
   detecting the roll angle of the hull at the time of laterally moving the hull; wherein
   the roll reduction process includes reducing the roll angle of the hull based on a result of the detected roll angle.

3. The lateral movement control method according to claim 1, wherein the boat includes an attitude controller to control an attitude of the hull; and the roll reduction process includes reducing an increase in the roll angle during lateral movement of the hull by controlling the attitude of the hull with the attitude controller during the lateral movement.

4. The lateral movement control method according to claim 3, further comprising:

detecting the roll angle of the hull at the time of laterally moving the hull; wherein the roll reduction process includes controlling the attitude of the hull with the attitude controller based on the detected roll angle to reduce the roll angle of the hull.

5. The lateral movement control method according to claim 1, wherein the boat includes a left trim tab and a right trim tab on a left side and a right side of the hull, respectively, and a left displacement mechanism and a right displacement mechanism to move the left trim tab and the right trim tab up and down, respectively; and the roll reduction process includes moving the right trim tab lower than the left trim tab when the hull moves laterally to the left.

6. The lateral movement control method according to claim 1, wherein the boat includes a left trim tab and a right trim tab on a left side and a right side of the hull, respectively; and the roll reduction process includes moving the left trim tab lower than the right trim tab when the hull moves laterally to the right.

7. The lateral movement control method according to claim 1, wherein the roll reduction process includes adjusting the output of the propulsion device so as to reduce the roll angle of the hull.

8. The lateral movement control method according to claim 7, further comprising:

detecting the roll angle of the hull at the time of laterally moving the hull; wherein the roll reduction process includes adjusting the output of the propulsion device based on the detected roll angle to reduce the roll angle of the hull.

9. The lateral movement control method according to claim 1, wherein the boat includes an operator operable by a user to control the output of the propulsion device based on an operation amount of the operator; and the roll reduction process includes adjusting the output of the propulsion device with respect to a unit operation amount of the operator to reduce the roll angle of the hull.

10. The lateral movement control method according to claim 9, further comprising:

detecting the roll angle of the hull at the time of laterally moving the hull; wherein the roll reduction process includes adjusting the output of the propulsion device with respect to the unit operation amount of the operator and the detected roll angle to reduce the roll angle of the hull.

11. The lateral movement control method according to claim 1, wherein the boat includes an operator operable by a user to change a rate of the output of the propulsion device based on an operation amount of the operator; and the roll reduction process includes limiting the change rate of the output of the propulsion device to reduce the roll angle of the hull.

12. The lateral movement control method according to claim 11, further comprising:

detecting the roll angle of the hull at the time of laterally moving the hull; wherein the roll reduction process includes limiting the change rate of the output of the propulsion device based on the detected roll angle to reduce the roll angle of the hull.

13. A boat propulsion system comprising:

a propulsion device configured to generate a lateral propulsion force to laterally move a hull without turning the hull; and a controller configured or programmed to:

cause the propulsion device to generate a the propulsion force to laterally move the hull based on an output of the propulsion device; and execute a roll reduction process to reduce a roll angle of the hull at a time of laterally moving the hull.

14. The boat propulsion system according to claim 13, wherein the controller is configured or programmed to detect the roll angle of the hull at the time of laterally moving the hull, and reduce the roll angle of the hull based on a result of the detected roll angle.

15. The boat propulsion system according to claim 13, further comprising:

an attitude controller configured or programmed to control an attitude of the hull; wherein the attitude controller roll is configured or programmed to control the attitude of the hull during the lateral movement.

16. The boat propulsion system according to claim 13, further comprising:

a left trim tab and a right trim tab on a left side and a right side of the hull, respectively; and a left displacement mechanism and a right displacement mechanism to move the left trim tab and the right trim tab up and down, respectively; wherein the controller is configured or programmed to move the right trim tab lower than the left trim tab when the hull moves laterally to the left, or move the left trim tab lower than the right trim tab when the hull moves laterally to the right.

17. The boat propulsion system according to claim 13, wherein the controller is configured or programmed to adjust the output of the propulsion device so as to reduce the roll angle of the hull.

18. The boat propulsion system according to claim 13, further comprising:

an operator operable by a user to control the output of the propulsion device based on an operation amount of the operator; and the controller is configured or programmed to adjust the output of the propulsion device with respect to a unit operation amount of the operator to reduce the roll angle of the hull.

19. The boat propulsion system according to claim 13, further comprising:

an operator operable by a user to change a rate of the output of the propulsion device based on an operation amount of the operator; and the controller is configured or programmed to limit the change rate of the output of the propulsion device to reduce the roll angle of the hull.

20. The boat propulsion system according to claim 19, wherein the controller is configured or programmed to detect the roll angle of the hull at the time of laterally moving the hull, and limit the change rate of the output of the propulsion device based on the detected roll angle to reduce the roll angle of the hull.

* * * * *